United States Patent [19]

Thomey et al.

[11] Patent Number: 4,696,663
[45] Date of Patent: Sep. 29, 1987

[54] BELT TENSIONER

[75] Inventors: Henry W. Thomey, Windsor; John B. Heuninck, Techumseh, both of Canada

[73] Assignee: Dyneer Corporation, Scottsdale, Ariz.

[21] Appl. No.: 851,460

[22] Filed: Apr. 14, 1986

[51] Int. Cl.$^4$ ............................................... F16H 7/08
[52] U.S. Cl. ..................................... 474/133; 474/135
[58] Field of Search ............... 474/101, 115, 117, 118, 474/133, 135, 136, 138; 267/134–136; 188/307; 74/497

[56] References Cited

U.S. PATENT DOCUMENTS

| 4,285,676 | 8/1981 | Kraft | 474/135 |
|---|---|---|---|
| 4,472,162 | 9/1984 | Hitchcock | 474/135 |
| 4,473,362 | 9/1984 | Thomey et al. | 474/135 |
| 4,536,172 | 8/1985 | Burris et al. | 474/135 |
| 4,551,120 | 11/1985 | Thomey | 474/135 |
| 4,557,707 | 12/1985 | Thomey | 474/135 |
| 4,557,709 | 12/1985 | St. John | 474/135 |
| 4,583,962 | 4/1986 | Bytzek et al. | 474/135 |
| 4,596,538 | 6/1986 | Henderson | 474/135 |
| 4,601,683 | 7/1986 | Foster | 474/133 |

Primary Examiner—Stephen J. Novosad
Assistant Examiner—Bruce M. Kisliuk
Attorney, Agent, or Firm—Sand & Hudak Co.

[57] ABSTRACT

A belt tensioning device for an endless drive belt for a vehicle accessories drive system. A housing is adapted to be mounted on an engine in a stationary position adjacent the drive belt and has a lever arm pivotally mounted thereon. An idler pulley is rotatably mounted on the lever arm and is movable into belt tensioning engagement by a torsional coil spring telescopically mounted about the pivot for the lever arm. A brake band ring is mounted on the lever arm and has a friction surface which is biased by the torsional spring into engagement with the housing to provide a damping force when the lever arm attempts to move in either a belt tensioning or non tensioning direction. The damping force is proportional to the torsional spring force generally throughout the tensioning range of the belt tensioner since the same coil spring provides both forces. A pivot shoe is removably mounted on the brake band adjacent the friction surface and a straight end of the torsional spring is engaged with the pivot shoe. The spring end is biased against a projection formed on the lever arm which acts as a fulcrum whereby the spring end biases the brake band into engagement with the housing through the pivot shoe. The angle of the spring end with respect to the pivot shoe effects the amount of damping force exerted by the brake band against the bracket through the biasing force of the spring.

25 Claims, 15 Drawing Figures

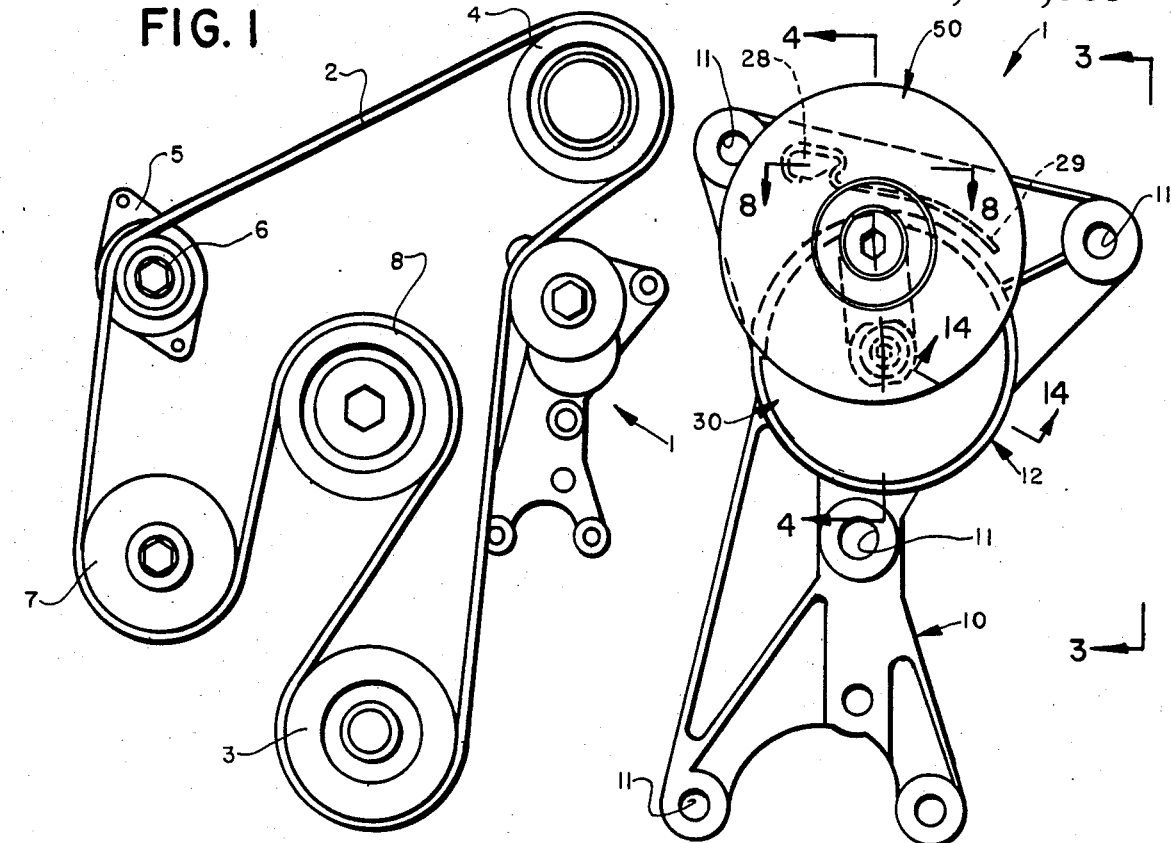
FIG. 1
FIG. 2
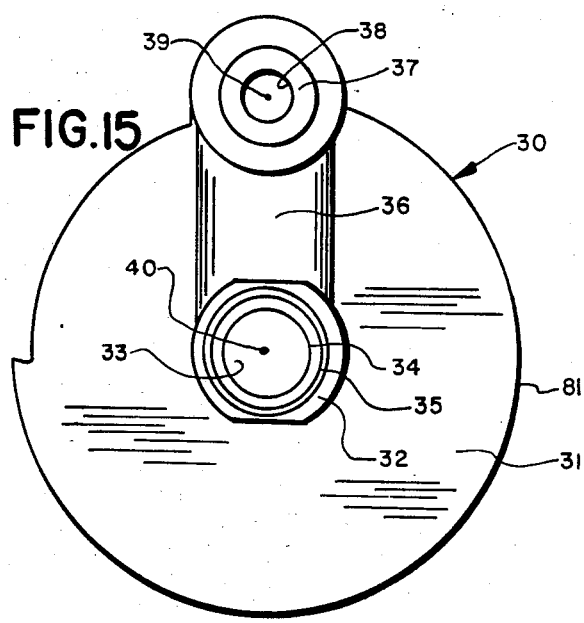
FIG. 15
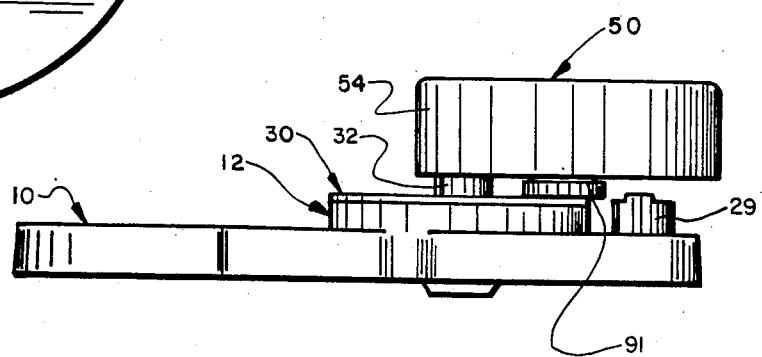
FIG. 3

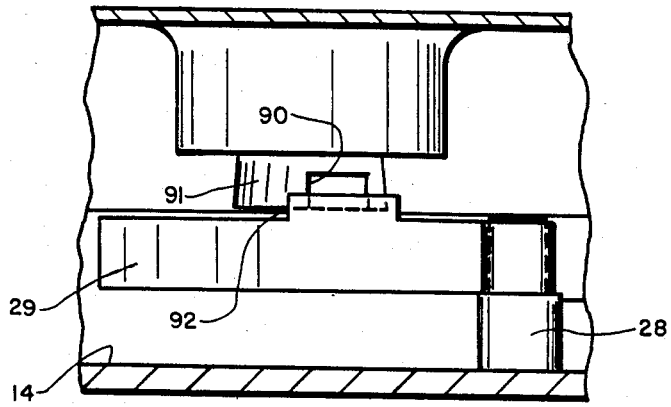
FIG. 8
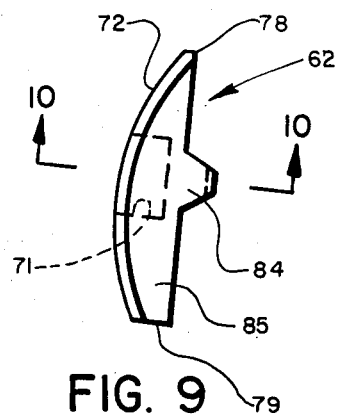
FIG. 9
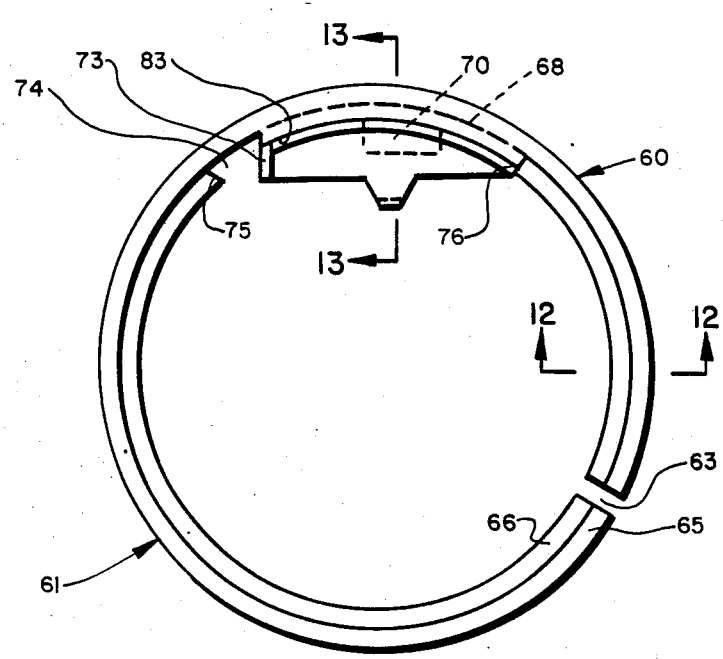
FIG. 11
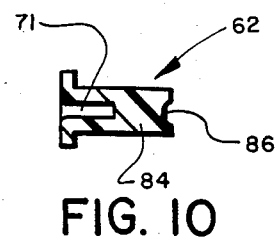
FIG. 10
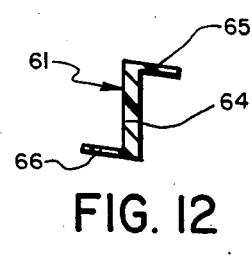
FIG. 12
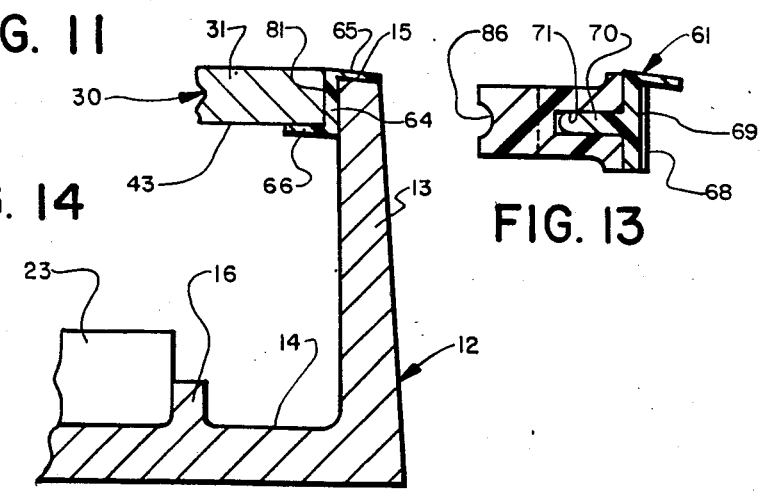
FIG. 14
FIG. 13

BELT TENSIONER

TECHNICAL FIELD

This invention relates to belt tensioning devices and in particular to spring biased belt tensioner for use with endless drive belts of the drive system for vehicle accessories. More particularly, the invention relates to a simple and inexpensive belt tensioner operated by a torsional spring in which an improved damping ring reduces undesirable vibration by retarding movement of the pulley mounting lever by using one end of the spring as a lever arm which moves about a fulcrum to move the damping ring into frictional engagement with a stationary mounting bracket.

BACKGROUND ART

There is a trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the driven belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension on the belt regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioning constructions have the disadvantage that the bushing must serve as the spring, provide the required damping and also maintain the alignment of the arm and all of these functions are therefore compromised. The spring rate compromise results in belt tensioner variation and the damping compromise results in a lack of motion control. Also, the bushing softness allows the arm to deflect resulting in less alignment control of the arm and pulley.

Numerous other types of belt tensioning devices use coil springs which are either in compression or tension, for applying and maintaining the tensioning force on a belt-engaging idler pully or chain-engaging sprocket. Some examples of these types of constructions are shown in U.S. Pat. Nos. 2,703,019; 2,893,255; 3,413,866; 3,483,763; 3,631,734; 3,768,324; 3,812,733; 3,924,483; 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488; 3,142,193; and 3,077,272.

Other known belt tensioner constructions, such as shown in U.S. Pat. No. 3,924,483, use a torsional spring for pivotally moving one of the vehicle accessories to achieve the desired tensioning force. Other constructions, such as shown in U.S. Pat. Nos. 3,136,170; 3,483,763; 3,834,246; and 4,285,676, use a torsional coil spring for pivotally moving a lever and idler pulley into belt tensioning engagement which provides a relatively simple, economical and compact unit. U.S. Pat. No. 4,473,362 shows still another belt tensioner which uses a torsional coil spring to provide a variable damping force by applying the radial forces exerted by the volutes of the spring against an internal elastomeric bushing.

It is desirable that a belt tensioner be provided with some type of damping means to prevent excessive oscillation from occurring in the spring tensioning member, and which will absorb sudden shocks to prevent a whipping action from occurring in the tensioner and drive belt. This damping action is especially critical when a coil spring is used for applying the belt tensioning force since coil springs are highly susceptible to developing natural oscillating frequencies when the counter force, which is exerted thereon by the belt, fluctuates during acceleration action. Such fluctuations effect the efficiency of the tensioning force applied to the belt by the coil spring and reduces belt life.

Various damping devices have been used with belt tensioners to eliminate or reduce this problem of coil spring oscillation. One type of construction uses a hydraulic fluid as the damping means, such as shown in U.S. Pat. Nos. 2,893,255; 3,964,311 and 3,986,407. U.S. Pat. No. 3,710,634 shows a belt tensioner which uses an eccentrically mounted mechanical pinion and rack arrangement which is spring biased by a leaf spring for absorbing an excessive amount of shock as opposed to providing a damping action for spring-biased belt tensioning plunger.

It also is high desirable when developing a belt tensioner intended primarily for use on an automobile to devise a construction which can be produced as inexpensively as possible without sacrificing durability and efficiency since a savings of only part of a dollar would amount to a sufficient overall savings when considering the millions of vehicles that are produced by the various vehicle manufacturers on which such belt tensioners will be mounted.

Many of these problems have been overcome by the belt tensioner which is the subject of patent application Ser. No. 598,043, filed Apr. 9, 1984, by a coinventor of the present application. In the belt tensioner of this application, a damping ring is biased into frictional engagement with the lever arm on which an idler pulley is mounted by the same torsional coil spring which provides the tensioning force on the lever arm. Such an arrangement insures that the amount of damping is proportional to the torque of the spring. Although the device of this pending application solves many of the problems, it is desirable to form the damping ring of a material suitable to achieve the most efficient frictional engagement between the pivotal movable lever arm and a stationary part of the bracket while in addition to providing a damping band of a material able to withstand the various forces exerted thereon by the biasing force of the torsional spring. Furthermore, it is desirable that the amount of damping force applied by the damping band from the torsional coil spring be changable without materially changing the component parts of the tensioner.

Therefore, the need has existed for such a belt tensioner having an improved damping arrangement which uses a damping band formed out of the most satisfactory and efficient friction material; in which the damping band is moved into damping engagement by the torsional spring which provides the belt tensioning force; in which the damping band is of such a material which is able to better withstand the forces exerted thereon by the coil spring; and in which the amount of tension exerted by the torsional spring on the damping band can be varied without materially affecting the biasing force exerted by the spring on the idler pulley lever arm.

DISCLOSURE OF THE INVENTION

Objectives of the invention include providing an improved device for tensioning the drive belt for vehicle accessories which maintains a generally constant predetermined tensioning force on the belt throughout the life of the belt regardless of whether the engine is on or off or operating at various speeds and conditions, and regardless of the tensioning position of the belt engaging idler pulley in its tensioning movement range.

Another objective is to provide such a tensioning device which is of a relatively inepxensive design formed of lightweight sheet or cast metal components which can be mass produced by simple metal working procedures and then assembled with a usual pulley and torsional spring; and in which the radial centerline of the belt engaging idler pulley groove is aligned with the radial centerline of the bushing on which the idler pulley lever mounting arm is pivotally mounted thereby reducing the unbalanced frictional force components heretofore exerted on the pivot bushing to increase the life and operating efficiency of the tensioner.

Still another objective is to provide such as a tensioning device having an improved damping mechanism consisting of a split ring of plastic material which is attached to a pivotally mounted lever arm and located adjacent the wall of an annular housing fixed to the engine; and in which the damping ring is moved into frictional engagement with the housing by a torsional spring acting through a backing shoe mounted on, or formed as part of the damping ring adjacent the area where the majority of the damping force is applied between the damping band and housing. A further objective is to provide such a tensioning device in which the damping band can be formed of the most efficient friction material and the backing shoe formed of a different material thereby enabling the shoe to be formed out of a stiffer and more durable material which is able to absorb the forces exerted thereon by the torsional spring more efficiently thereby enabling the damping device to be formed of two different materials utilizing the best characteristics of both materials.

Still another objective is to provide such a tensioning device having an improved damping mechanism in which one end of the torsional spring is biased radially outwardly about a fulcrum formed on the lever arm and into engagement with the damping band backing shoe to satisfactorily transmit the biasing force of the torsional spring against the damping band, and in which the directional angle of the shoe engaging spring end can be changed easily to adjust the amount of tension exerted radially outwardly by the spring against the damping band which determines the amount of the friction force exerted by the damping band between the lever arm and housing.

A further objective of the invention is to provide such an improved belt tensioner in which the backing shoe is mounted on the damping band by an angled tab which also forms one side of an opening into which a complementary shaped projection that is formed on the lever arm is inserted for mounting the damping band on the lever arm; and in which a force component exerted by the torsional spring against the backing shoe assists in clamping the angled tab against the mounting projection to secure the damping band on the lever arm and to prevent it from rotating thereon.

Still another objective of the invention is to provide an improved belt tensioner in which the damping band also provides a seal between the lever arm and housing to reduce dirt and debris from entering the housing and affecting the operation of the lever arm pivot shaft and torsional spring which are located within the housing.

A further objective is to provide such an improved belt tensioner which achieves the stated objectives in a simple, effective, rugged and relatively inexpensive manner and which solves problems and satisfies needs existing in the art.

These objectives and advantages are obtained by the improved belt tensioner construction of the invention which automatically tensions an endless drive belt of a drive system for vehicle engine accessories, the general nature of which may be stated as including a housing adapted to be mounted on a vehicle adjacent the belt drive; lever means pivotally mounted on the bracket for movement toward and away from the drive belt; pulley means rotatably mounted on the lever means and engageable with the drive belt for applying a tensioning force on said belt when the lever means is biased in a belt-tensioning direction toward the drive belt; spring means acting between the housing and lever means for biasing the lever means in the belt tensioning direction; brake means mounted on the lever means for frictional engagement with the housing for retarding pivotal movement of the lever means with respect to the housing; and fulcrum means formed on the lever means and engaged by the spring means for directing a first end of the spring means into engagement with the brake means biasing the brake means into frictional engagement with the housing as the spring means biases the lever means in the belt tensioner direction.

BRIEF DESCRIPTION OF THE DRAWINGS

A preferred embodiment of the invention, illustrative of the best mode in which applicants have contemplated applying the principles, is set forth in the following description and is shown in the accompanying drawings, and is particularly and distinctly pointed out and set forth in the appended claims.

FIG. 1 is a diagrammatic view looking toward the front of an engine illustrating an endless drive belt operatively connected to and driving the vehicle accessories with the improved belt tensioner engaged with the belt;

FIG. 2 is an enlarged plan view of the belt tensioner of FIG. 1 removed from engagement with the endless belt drive;

FIG. 3 is a fragmentary and elevational view of the improved belt tensioner looking in the direction of Arrows 3—3, FIG. 2;

FIG. 8 is an enlarged fragmentary sectional view with portions broken away, taken on line 8—8, FIG. 2;

FIG. 9 is a plan view of the backing shoe of the damping band component of the improved belt tensioner;

FIG. 10 is a sectional view taken on line 10—10, FIG. 9;

FIG. 11 is a plan view of the improved damping band;

FIG. 12 is an enlarged sectional view taken on line 12—12, FIG. 11;

FIG. 13 is an enlarged sectional view taken on line 13—13, FIG. 11;

FIG. 14 is an enlarged fragmentary sectional view taken on line 14—14, FIG. 2; and FIG. 15 is a top plan view of the lever arm component of the improved belt tensioner.

Similar numerals refer to similar parts throughout the drawings.

BEST MODE FOR CARRYING OUT THE IVNENTION

Figure 4:
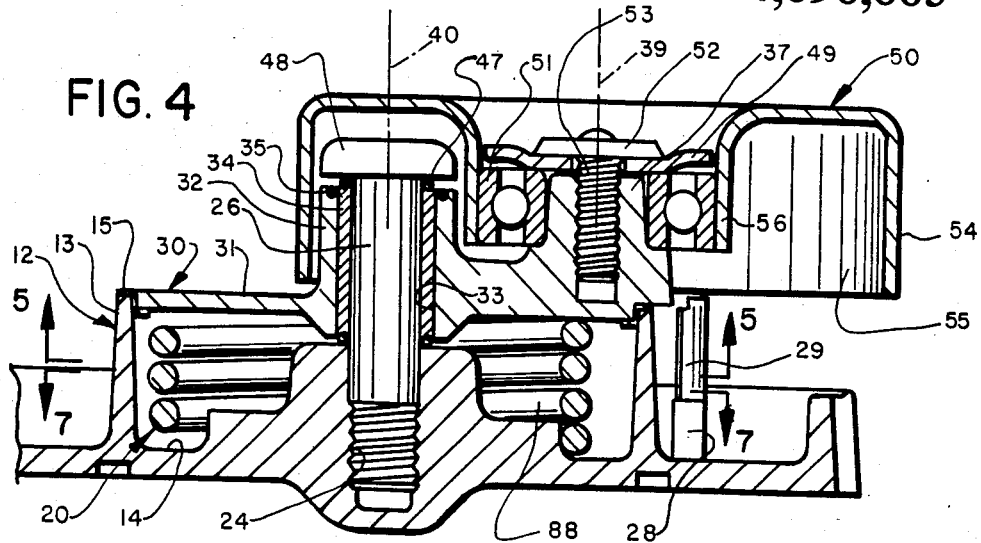
FIG. 4 is an enlarged fragmentary sectional view taken on line 4—4, FIG. 2.

Referring to FIG. 1 of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by their association with the engine accessories and their locations relative to each other. The various pulleys are supported on their respective engine components which in turn are mounted on an engine (not shown) in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Improved belt tensioner 1 includes an engine mounting bracket indicated generally at 10, which preferable is formed of an aluminum casting. Bracket 10 is provided with a plurality of mounting holes 11, five of which are shown on the particular bracket configuration of the drawings for mounting the bracket onto the vehicle engine. Bracket 10 further includes an annular-shaped housing indicated generally at 12 (FIGS. 4 and 7), which includes a generally cylindrical wall 13 which extends upwardly from a base surface 14. Cylindrical wall 13 includes a top circular edge 15 which defines the opening into the interior of housing 12. Tensioner 1 need not have a mounting bracket such as bracket 10 for certain applications. Likewise, bracket 10 may be used to support an accessory or may be used to attach tensioner housing 12 to the vehicle engine or another bracket.

Figure 7:
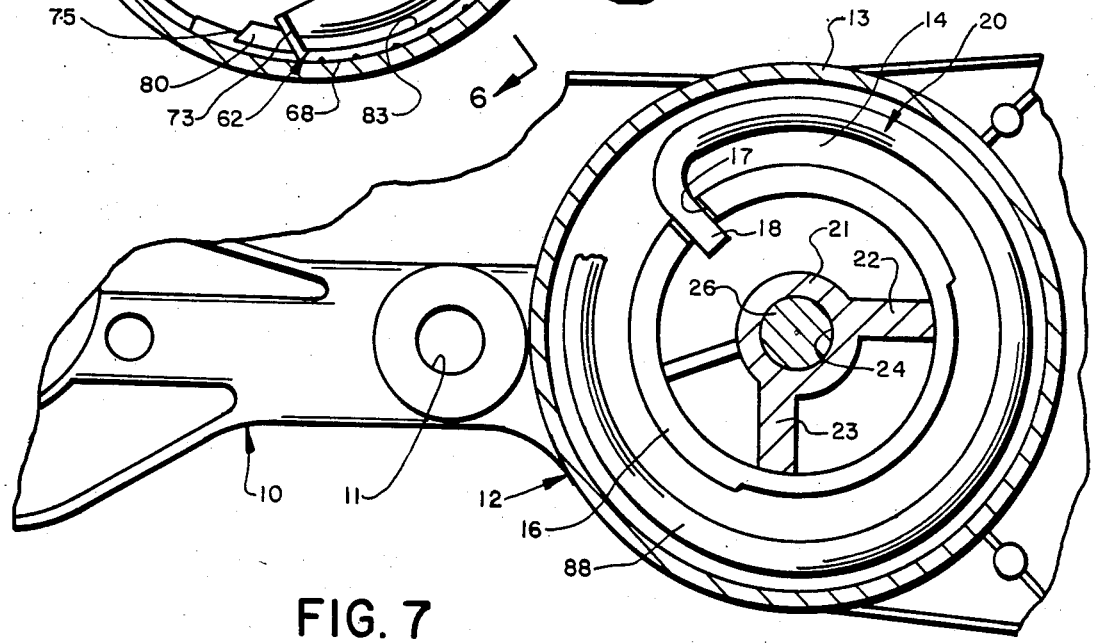
FIG. 7 is a fragmentary sectional view taken on line 7—7, FIG. 4.

Referring to FIGS. 7 and 14, an annular-shaped projection 16 is formed integrally with base surface 14 and projects upwardly within the opening of housing 12. Projection 16 has an opening 17 at one location on its periphery for receiving the bent end 18 of a torsional coil spring indicated generally at 20. A hub 21 is formed integrally with base surface 14 and projects upwardly within the housing interior concentric with annular projection 16 and cylindrical wall 13. Hub 21 is formed with a threaded bore 24 which preferably is cast without threads with the threads subsequently being formed therein by a pivot shaft 26 as it is driven into the bore, FIG. 4. A pair of stops 22 and 23 may be formed integrally with hub 21 or as separate components and extend generally radially outwardly therefrom terminating at annular projection 16. Stops 22 and 23 form an included angle which is approximately 90 for the particular embodiment shown in the drawings. Bracket 10 also may include an anchor post 28 (FIGS. 4, 5 and 8), on which is mounted a strip of spring steel which forms a retention clip 29, the purpose of which is described in greater detail below.

Tensioner 1 further includes a lever arm indicated generally at 30 (FIG. 15), which is pivotally mounted on bracket 10 by shaft 26 (FIG. 4). Lever arm 30 includes a disc-shaped plate 31 formed with an upstanding central boss 32 having an opening 33 in which a bearing sleeve 34 is press fitted and having a top sealing o-ring 35. A raised arm 36 is formed integrally with plate 31 and extends radially outwardly from central boss 32 and terminates in an upwardly extending stub shaft 37. Stub shaft has a bore 38, the axis 39 of which is parallel with the axis 40 of central boss 32.

Figure 5:
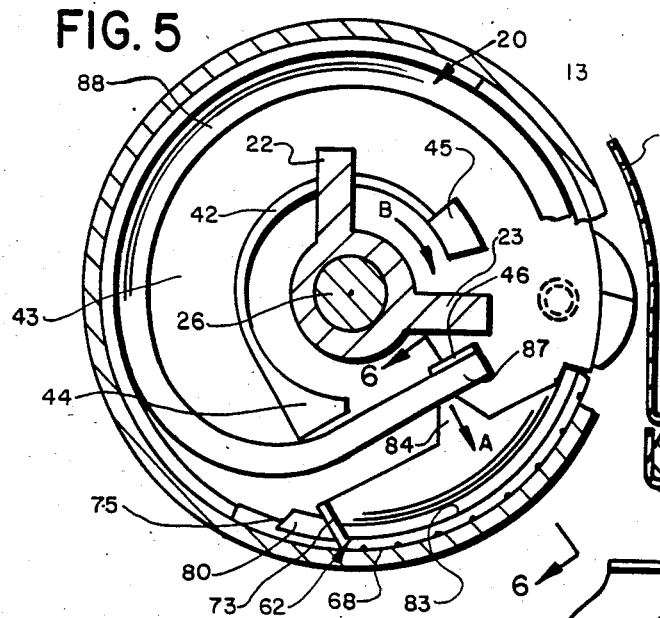
FIG. 5 is a sectional view with portions broken away, taken on line 5—5, FIG. 4.
Figure 6:
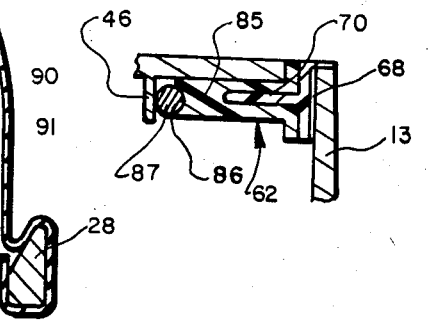
FIG. 6 is an enlarged fragmentary sectional view taken on line 6—6, FIG. 5.

Referring to FIG. 5, a generally semi-circular shaped projection 42 is formed on bottom surface 43 of plate 31 and terminates in a pair of end projections 44 and 45. Another projection 46 is formed on bottom plate surface 43 and is located generally between projections 44 and 45. Projections 44 and 45 may be formed integrally with projection 42 as shown in the drawings or as separate free standing components. Lever arm 30 preferably is an integral one-piece aluminum casting with the various projections and bosses being formed as an integral part thereof providing a sturdy, durable and lightweight one-piece component. Lever arm 30 is pivotally mounted on bracket 10 by shaft 26 as shown in FIG. 4 which includes a second o-ring 47 located between head 48 of shaft 26 and bearing sleeve 34.

An idler pulley indicated generally at 50 (FIG. 4) is rotatably mounted on stub shaft 37 by a bearing ring 51, a dust cap 49 and a mounting bolt 53 which preferably includes a flanged head 52. Idler pulley 50 and its mounting arrangement on bracket 10 is similar to that shown in U.S. Pat. No. 4,551,120. Pulley 50 includes an outer annular belt engaging wall 54 and has an inverted U-shaped cross sectional configuration formed with a ring-like opening 55 located between outer annular wall 54 and an inner annular wall 56. Pulley 50 is mounted on stub shaft 37 so that pivot shaft 26 is located within the periphery of pulley 50 and preferably extends into ring-like opening 55. This pulley mounting arrangement provides a relatively large circumferential belt wrap with a short moment arm between the idler pulley mounting shaft and the pivot shaft on which the idler pulley lever arm is pivotally mounted. Furthermore, as shown in FIG. 4, the frictional forces which are exerted against lever arm pivot bushing 34 and shaft 26 are reduced considerably by the location of pivot shaft 26 within the periphery of belt engaging surface 54. Likewise, the radial centerline of belt engaging idler pulley surface 54 is aligned generally with the center line of bearing sleeve 34 on which lever arm 30 is pivotally mounted thereby reducing the unbalanced frictional force component heretofore exerted on the pivot bushing.

In accordance with one of the main features of the invention, an improved brake means indicated generally at 60, is mounted on lever arm 30 and frictionally engages housing 12, an in particular frictionally engages housing wall 13 thereof to provide damping for the movement of lever arm 30 with respect to housing 12. Brake means 60 (FIGS. 9 -13) includes an annular brake band indicated generally at 61, and a backing shoe indicated generally at 62. Band 61 has a generally ring-like annular configuration preferably having a split 63 at one location on its periphery and has a generally z-shaped configuration provided by an annular wall 64 and a pair of opposed flanges 65 and 66 which extend outwardly in opposite directions from the ends of wall 64 as shown in FIG. 12.

Brake band 61 further includes an arcuate shaped friction surface 68 formed along one portion of annular wall 64 (FIGS. 5, 6, 11 and 13) which frictionally engages an inner portion of annular wall 13 of housing 12. A plurality of axially extending slots 69 may be formed in surface 68 and may contain a lubricating grease and provides an area for dirt to collect to reduce its harmful effect on the frictional engagement between surface 68 and a portion of the inner surface of housing wall 13. Brake band 61 further includes a generally radially inwardly extending shoe mounting tab 70 located on the inside surface of friction surface 68. Tab 70 is adapted to be inserted into a complementary shaped groove 71 (FIG. 13) formed in an outer convex arcuate surface 72 of backing shoe 62. Brake band 61 further includes an angled generally inwardly extending tab 73 which forms a pocket 74 with a projection 75 formed at the junctin of sealing flange 66 and arcuate friction surface 68, the purpose of which is described in greater detail below.

A shoulder 76 formed at the junction of sealing flange 66 and the opposite end of friction surface 68 provides an abutment for engagement with end 78 of backing shoe 62 for retention during assembly.

Backing shoe 62 is removably mounted on brake band 61 by engagement of shoe mounting tab 70 in shoe groove 71 and the abutment of shoe edge 78 with shoulder 76 and the abutting engagement between angled tab 73 and a complementary shaped flat edge surface 79 of backing shoe 62. Thus, backing shoe 62 is removably mounted on brake band 60 adjacent the inside surface of friction surface 68 by tabs 70 and 73 and shoulder 76. Shoulder 76 is angled slightly towards backing shoe 62 to provide a clamping action therewith to assist in securing the brake shoe on brake band 61.

Brake means 60 which includes brake band 61 and backing shoe 62, is removably mounted on lever arm 30 by insertion of a projection 80 which is formed on surface 43 of disc-shaped plate 31 (FIG. 5) into a complementary-shaped pocket 74 of brake band 61. When brake means 60 is mounted on lever arm 30, sealing flange 66 will engage the outer periphery of lever arm plate surface 43 (FIG. 14) and the inner surface of annular wall 64 will abut against circular edge 81 of lever arm plate 31. When lever arm 30 is mounted on bracket 10 by shaft 26, outwardly extending sealing flange 65 will abut and lie along the top circular edge 15 of housing wall 13 as shown in FIG. 14. Furthermore, when brake means 60 is mounted on lever arm 30, arcuate friction surface 68 lies in abutment with a portion of the inner surface of housing wall 13 as shown in particularly in FIG. 5.

In accordance with another of the main features of the invention, arcuate surface 72 of backing shoe 62 lies against a complementary shaped inner arcuate surface 83 of brake band 61 and a projection 84 which extends outwardly from body 85 of shoe 62 has a groove 86 formed therein providing a seat for spring end 87 which is engaged therewith.

Referring to FIG. 5, spring end 87 is a generally straight section extending inwardly from the circular convolutions 88 which form spring 20. Straight spring end 87 extends inwardly from the end most convolution across projection 44 and is engaged in groove 86 of backing shoe 62. Projection 44 forms a fulcrum for spring end 87 which biases backing shoe 62 and correspondingly, brake band friction surface 68 into frictional damping engagement with the interior surface of housing wall 13 in the general direction of arrow A (FIG. 5). Projection 46 assists in maintaining spring end 87 in engagement with backing shoe 62.

Lever arm projection 45 engages projections 22 and 23 formed on housing 12 and functions as a stop to limit the pivotal movement of lever arm 30 between the minimum and maximum belt tensioning positions. As shown in FIG. 5, lever arm 30 is in a generally intermediate tensioning position wherein stop projection 45 is located between projections 22 and 23.

The two piece construction of brake means 60 enables brake band 61 to be formed out of a material which provides the desired frictional characteristics for arcuate friction surface 68 while enabling backing shoe 62 to have the desired strength and rigidity for transferring the biasing force of spring end 87 through shoe 62 for forcing friction surface 68 against housing wall 13.

A shoulder 90 (FIG. 5) is formed on the underside surface of a circular base 91 on which stub shaft 37 is formed. Spring retention clip 29 (FIG. 8) is formed with a shoulder 92 which engages shoulder 90 of lever arm 30 upon rotation of the lever arm and manual inward movement of spring clip 29 toward circular base 91. Spring clip 29 is shown in disengaged position with shoulder 90 in FIG. 8.

Spring clip 29 is used only at the time of installation of belt tensioner 1 on an engine. Spring 20 biases lever arm 30 in the direction of arrow B (FIG. 5) which when clip 29 is forced manually inwardly will enable shoulder 90 of the lever arm to abut against shoulder 92 on the spring clip maintaining the lever arm in the engaged position with the spring clip. When in this position idler pulley 50 will be located between mounting holes 11 of bracket 10 somewhat similar to that shown in FIG. 2, thereby completely exposing all of mounting holes 11 enabling an automatic tool to simultaneously insert five bolts through holes 11 and into the engine block or other engine component on which the bracket will be mounted. After tensioner 1 is mounted on an engine, the biasing force of spring 20 forces spring clip 29 to remain in the notch at the end of the lever arm. When the lever arm is manually rotated in the direction opposite to the biasing force of spring 20 the notch in the lever arm leaves the spring clip whereupon the biasing force of the spring clip which is in a direction away from the arm, moves the clip from the lever arm allowing the arm to be returned by spring 20 to the position shown in FIG. 2.

Clip 29 is a feature used only at the time of installation of tensioner 1 on a vehicle engine to facilitate the use of automatic mounting equipment and does not assist or affect the tensioning and damping ability of the improved belt tensioner.

The operation of improved belt tensioner 1 is described below with particular reference to FIGS. 4, 5 and 7 of the drawings. End 18 of spring 20 is attached to housing 12 and opposite straight spring end 87 is engaged with fulcrum 44 of lever arm 30 and is engaged with backing shoe 62. Spring 20 when operatively engaged with housing 12 and lever arm 30 is placed in tension whereby spring end 87 will attempt to move outwardly in the direction of arrow A (FIG. 5). The force exerted by spring 20 provides the belt tensioning force since it will bias lever arm 30 in a counter-clockwise direction when viewing FIGS. 1 and 2 and will use projection 44 as a fulcrum to move arcuate friction surface 68 into frictional engagement with housing wall 13 by transmission of the spring biasing force through backing shoe 62. The outward force exerted by spring end 87 will result in a generally equal opposite force against fulcrum projection 44, which outward force is exerted against the stationary wall of housing 12 through friction surface 68 providing the desired damping to the belt tensioner. Thus spring 20 provides both the belt tensioning biasing force and the damping force.

Since torsional spring 20 provides both the tensioning force for pivotally moving lever arm 30 in the belt tensioning direction and the force for moving brake means 60 into frictional engagement with housing wall 13 this insures that the amount of damping is proportional to the belt tensioning force providing a uniform damping throughout the tensioning range of the tensioning spring. Also, the amount of damping provided by brake means 60 can be adjusted easily to correspond to the particular engine on which tensioner 1 is mounted by merely changing the angle that spring end 87 forms with the convolutions of the spring and correspondingly the angle that it engages backing shoe 62 or by changing the distance between fulcrum projection 44 and shoe projection 84 as shown in FIG. 5. Referring to FIG. 5, it is seen that the angle at which spring end 87 extends with respect to fulcrum 44 will determine the force component exerted against backing shoe 62 and correspondingly the amount of force exerted by arcuate friction surface 68 against housing wall 13.

Another main advantage by improved belt tensioner 1 is that the two piece construction of brake means 60 enables the most efficient results to be achieved by both of the components namely, brake band 61 and backing shoe 62. This construction enables the desired frictional characteristics to be achieved by brake band 61 and the desired strength and rigidity to be achieved by backing shoe 62. Another advantage achieved by improved belt tensioner 1 is that the z-shaped configuration of brake band 61 and in particular flanges 65 and 66 as shown in FIGS. 12 and 14, provides a sealing engagement with lever arm 30 and housing 12 to prevent dust, dirt and other debris from entering housing 12 and affecting the operation of pivot shaft 26 and bearing 34. Also, it has been found that the placement of a lubricating grease in grooves 69 of friction surface 68 prevents salt water from effecting the frictional engagement of surface 68 with the interior surface of housing wall 13.

Furthermore, the particular mounting arrangement of backing shoe 62 on brake band 61 achieved by tabs 70 and 73 and shoulder 76 provides a clamping action against backing shoe 62 to retain it in position on tab 70. Likewise, the shaped pocket 74 of brake band 61 securely mounts brake means 60 on lever arm 30 preventing any sliding or rotational movement therebetween to insure that the biasing force exerted by spring end 87 is transferred through backing shoe 62 and frictional surface 68 and against housing wall 13. Also, spring clip 29 provides a means of enabling idler pulley 50 to be maintained in a position on bracket 10 so that all of the bracket mounting holes 11 are exposed for use of automatic installation equipment when mounting improved belt tensioner 1 on a vehicle engine.

Accordingly, the improved belt tensioner construction is simplified, provides an effective, safe, inexpensive, and efficient device which achieves all the enumerated objectives, provides for eliminating difficulties encountered with prior constructions, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved belt tensioner is constructed and used, the characteristics of the construction, and the advantageous, new and useful results obtained; the new and useful structures, devices, elements, arrangements, parts, and combinations, are set forth in the appended claims.

What is claimed is:

1. A belt tensioner construction for automatically tensioning an endless belt of a drive system for vehicle accessories, said tensioner construction including:
   (a) a housing adapted to be mounted on a vehicle adjacent the drive belt;
   (b) lever means pivotally mounted with respect to the housing for movement toward and away from the drive belt;
   (c) pulley means rotatably mounted on the lever means and engageable with the drive belt for applying a tensioning force on said belt when the lever means is biased in a belt-tensioning direction toward the drive belt;
   (d) spring means acting between the housing and lever means for biasing the lever means in the belt tensioning direction;
   (e) brake means mounted on the lever means for frictional engagement with the housing for retarding pivotal movement of the lever means with respect to the housing; and
   (f) fulcrum means formed on the lever means and engaged by the spring means for directing a first end of the spring means into engagement with the brake means biasing the brake means into frictional engagement with the housing as the spring means biases the lever means in the belt tensioner direction.

2. The belt tensioner construction defined in claim 1 in which the lever means is pivotally mounted with respect to the housing by a pivot shaft; and in which the spring means is a torsional coil spring telescopically mounted about the pivot shaft.

3. The belt tensioner construction defined in claim 2 in which the lever means includes an arm portion extending radially outwardly from the pivot shaft; and in which the pulley means is rotatably mounted on an extended end of the arm portion.

4. The belt tensioner construction defined in claim 3 in which the pulley is an idler pulley and includes an annular belt engaging wall which extends circumferentially about a stub shaft on which the pulley is rotatably mounted; and in which the pivot shaft is parallel with and spaced from the stub shaft and is located within the circumference of the pulley defined by the annular belt engaging wall.

5. The belt tensioner construction defined in claim 4 in which the idler pulley includes an outer annular portion having an inverted u-shaped cross-sectional configuration which forms a ring-like opening; and in which the pivot shaft extends into the ring-like opening of said inverted u-shaped outer annular portion.

6. The belt tensioner construction defined in claim 2 in which the housing has a base surface and a cylindrical wall extending outwardly from said base surface and terminating in a circular top edge; in which the pivot shaft and coil spring are located within the housing; and in which the lever means includes a disc-shaped plate pivotally mounted on the pivot shaft adjacent the top edge of the housing.

7. The belt tensioner construction defined in claim 6 in which the brake means includes an annular band mounted on the lever means plate and extending along a peripheral edge of said plate; and in which the band has an arcuate-shaped friction surface which frictionally engages the cylindrical wall of the housing to provide the frictional engagement between the housing and lever means.

8. The belt tensioner construction defined in claim 7 in which the brake band is split at one location on its circumference and has a generally z-shaped configuration throughout a major portion of its circumference formed by an annular wall and a pair of sealing flanges which extend outwardly in opposite direction from opposite ends of said annular wall.

9. The belt tensioner construction defined in claim 6 in which a pair of spaces stops are formed on the base surface of the housing and are engageable with a stop formed on the lever means to limit the pivotal movement of the lever means between a minimum and maximum belt tensioning position.

10. The belt tensioner construction defined in claim 1 in which the housing is mounted on a bracket; and in which clip means is mounted on the bracket and is engageable with the lever means for releasably holding the lever means is a predetermined position to facilitate mounting of the bracket on a vehicle.

11. The belt tensioner construction defined in claim 1 in which the spring means is a torsional coil spring having a plurality of generally circular-shaped volutes; in which the spring has a second end which is attached to the housing; in which the first end of the spring is a generally straight section; in which the brake means has a ring-like member attached to the lever means and is provided with an arcuate section of friction material for engaging the housing and has a backing shoe located adjacent the arcuate section of said friction material; and in which the straight section of the first end of the coil spring extends between the fulcrum means and backing shoe whereby the biasing force of the torsional spring moves the first end of the spring outwardly about the fulcrum means and presses the friction material of the brake means into engagement with the housing.

12. A belt tensioner construction for automatically tensioning an endless belt of a drive system for vehicle accessories, said tensioner construction including:
  (a) a housing mounted on a bracket adapted to be mounted on a vehicle adjacent the drive belt;
  (b) lever means pivotally mounted with respect to the housing for movement toward and away from the drive belt;
  (c) clip means mounted on the bracket and engagable with the lever means for releasably holding the lever means in a predetermined position to facilitate mounting of the bracket on a vehicle;
  (d) pulley means rotatably mounted on the lever means and engagable with the drive belt for applying a tensioning force on said belt when the lever means is biased in a belt-tensioning direction toward the drive belt;
  (e) spring means acting between the housing and lever means for biasing the lever means in the belt tensioning direction;
  (f) brake means mounted on the lever means for frictional engagement with the housing for retarding pivotal movement of the lever means with respect to the housing; and
  (g) fulcrum means formed on the lever means and engaged by the spring means for directing a first end of the spring means into engagement with the brake means biasing the brake means into frictional engagement with the housing as the spring means biases the lever means in the belt tensioner direction.

13. The belt tensioner construction defined in claim 12 in which the lever means is biased by the spring means to move the pulley means between first and second belt tensioning positions; and in which the clip means releaseably holds the lever means whereby the pulley means is in an intermediate position between said first and second positions.

14. The belt tensioner construction defined in claim 12 in which the clip means is a strip of spring steel having an end attached to the bracket with said strip extending adjacent to the lever means; in which the strip includes a stop surface engageable with a complementary stop surface formed on the lever means upon flexing of the spring steel strip; and in which the biasing force of the spring means maintains said stop surfaces in engagement to maintain the pulley means in the intermediate position.

15. The belt tensioner construction defined in claim 14 in which the stop surfaces are shoulders formed on an edge of the spring steel strip and on the lever means.

16. A belt tensioner construction for automatically tensioning an endless belt of a drive system for vehicle accessories, said tensioner construction including:
  (a) a housing having a base surface and a cylindrical wall extending outwardly from said base surface and terminating in a circular top edge, said housing adapted to be mounted on a vehicle adjacent the drive belt;

(b) lever means having a disc-shaped plate pivotally mounted adjacent the circular top edge of the housing by a pivot shaft for movement toward and away from the drive belt;

(c) pulley means rotatably mounted on the lever means and engagable with the drive belt for applying a tensioning force on said belt when the lever means is biased in a belt-tensioning direction toward the drive belt;

(d) torsional coil spring means telescopically mounted about the pivot shaft and located within the housing and acting between the housing and lever means for biasing the lever means in the belt tensioning direction;

(e) brake means mounted on the lever means for frictional engagement with the housing for retarding pivotal movement of the lever means with respect to the housing; said brake means including an annular band mounted on the lever means plate and extending along a peripherial edge of said plate, said band having an arcuate-shaped friction surface which frictionally engages the cylindrical wall of the housing to provide the frictional engagement between the housing and lever means, with said annular band being split at one location on its circumference and having a generally z-shaped configuration throughout a major position of its circumference formed by an annular wall and a pair of sealing flanges which extend outwardly in opposite directions from opposite ends of said annular wall; and (f) fulcrum means formed on the lever means and engaged by the spring means for directing a first end of the spring means into engagement with the brake means biasing the brake means into frictional engagement with the housing as the spring means biases the lever means in the belt tensioner direction.

17. The belt tensioner construction defined in claim 16 in which the annular wall of the brake band is telescopically inserted within the cylindrical wall of the housing with one of the brake band sealing flanges lying along the circular top edge of the housing and with the other of said brake band sealing flanges extending radially inwardly and engaged with the lever means plate.

18. The belt tensioner construction defined in claim 17 in which tab means is formed on the lever means and is seated in a pocket formed in the brake band to secure said brake band on the lever means.

19. The belt tensioner construction defined in claim 17 in which the brake means includes a shoe attached to the brake band adjacent the arcuate-shaped friction surface; and in which the first end of the spring means is engaged with the shoe to bias the friction surface into engagement with the housing.

20. The belt tensioner construction defined in claim 19 in which the brake band includes a plurality of generally radially inwardly extending tabs for mounting the shoe on said brake band.

21. The belt tensioner construction defined in claim 20 in which one of the brake band shoe mounting tabs is spaced from a second tab and forms an opening therebetween; and in which a complementary shaped projection is formed on the lever means plate and is received in said opening to position the brake band on the lever means.

22. A belt tensioner construction for automatically tensioning an endless belt of a drive system for vehicle accessories, said tensioner construction including:

(a) A housing having a base surface with a pair of spaced stops and a cylindrical wall extending outwardly from said base surface and terminating in a circular top edge adapted to be mounted on a vehicle adjacent the drive belt;

(b) lever means having a stop and a disc-shaped plate pivotally mounted adjacent the circular top edge of the housing by a pivot shaft for movement toward and away from the drive belt, said stop being engagable with the spaced stops of the housing to limit the pivotal movement of the lever means between a minimum and maximum belt tensioning position;

(c) pulley means rotatably mounted on the lever means and engagable with the drive belt for applying a tensioning force on said belt when the lever means is biased in a belt-tensioning direction toward the drive belt;

(d) torsional coil spring means telescopically mounted about the pivot shaft and located within the housing acting between the housing and lever means for biasing the lever means in the belt tensioning direction;

(e) brake means mounted on the lever means for frictional engagement with the housing for retarding pivotal movement of the lever means with respect to the housing; and (f) fulcrum means formed on the lever means and engaged by the spring means for directing a first end of the spring means into engagement with the brake means biasing the brake means into frictional engagement with the housing as the spring means biases the lever means in the belt tensioner direction.

23. A belt tensioner construction for automatically tensioning an endless belt of a drive system for vehicle accessories, said tensioner construction including:

(a) a housing adapted to be mounted on a vehicle adjacent the drive belt;

(b) lever means pivotally mounted with respect to the housing for movement toward and away from the drive belt;

(c) pulley means rotatably mounted on the lever means and engagable with the drive belt for applying a tensioning force on said belt when the lever means is biases in a belt-tensioning direction toward the drive belt;

(d) a torsional coil spring acting between the housing and lever means for biasing the lever means in the belt tensioning direction, said coil spring having a plurality of generally circular-shaped volutes and first and second ends with said first end being a generally straight section and said second end being engaged with the housing;

(e) brake means mounted on the lever means including a ring-like member and an arcuate section of friction material for engagement with the housing for retarding pivotal movement of the lever means with respect to the housing, and a backing shoe located adjacent said arcuate section;

(f) fulcrum means formed on the lever means and engaged by the first end of the spring means extending between the fulcrum means and backing shoe for directing said first end of the spring means outwardly about the fulcrum means into engagement with the brake means biasing the friction material of the brake means into frictional engagement with the housing as the spring means biases the lever means in the belt tensioner direction.

24. The belt tensioner construction defined in claim 23 in which the backing shoe is a separate member formed of a different material than that of the ring-like member of the brake means; and in which the backing shoe is removeably mounted on said ring-like member by tab mens extending inwardly from said member.

25. The belt tensioner construction defined in claim 23 in which a plurality of axially extending grooves are formed in the arcuate section of friction material.

* * * * *